United States Patent Office 2,973,805
Patented Mar. 7, 1961

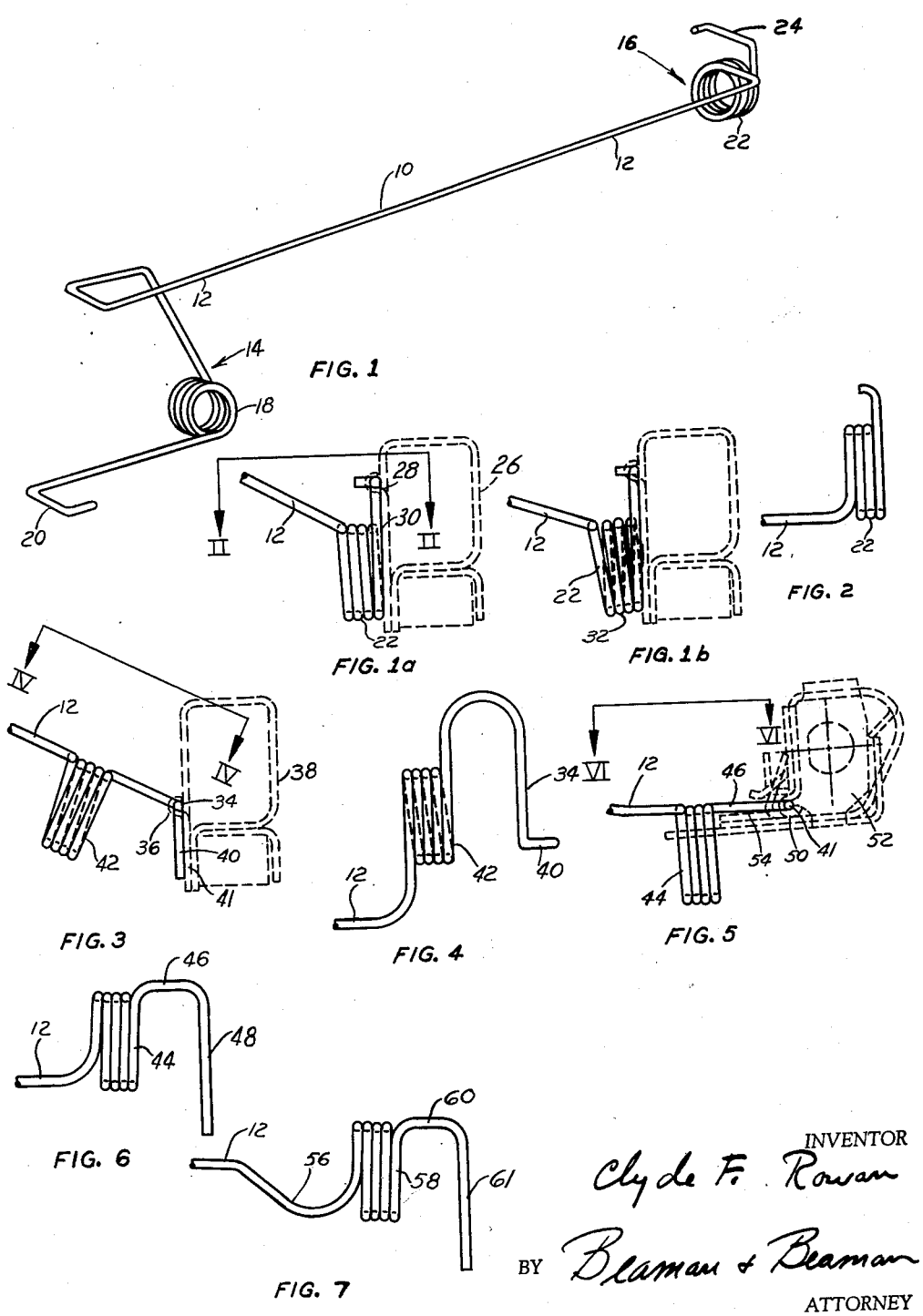

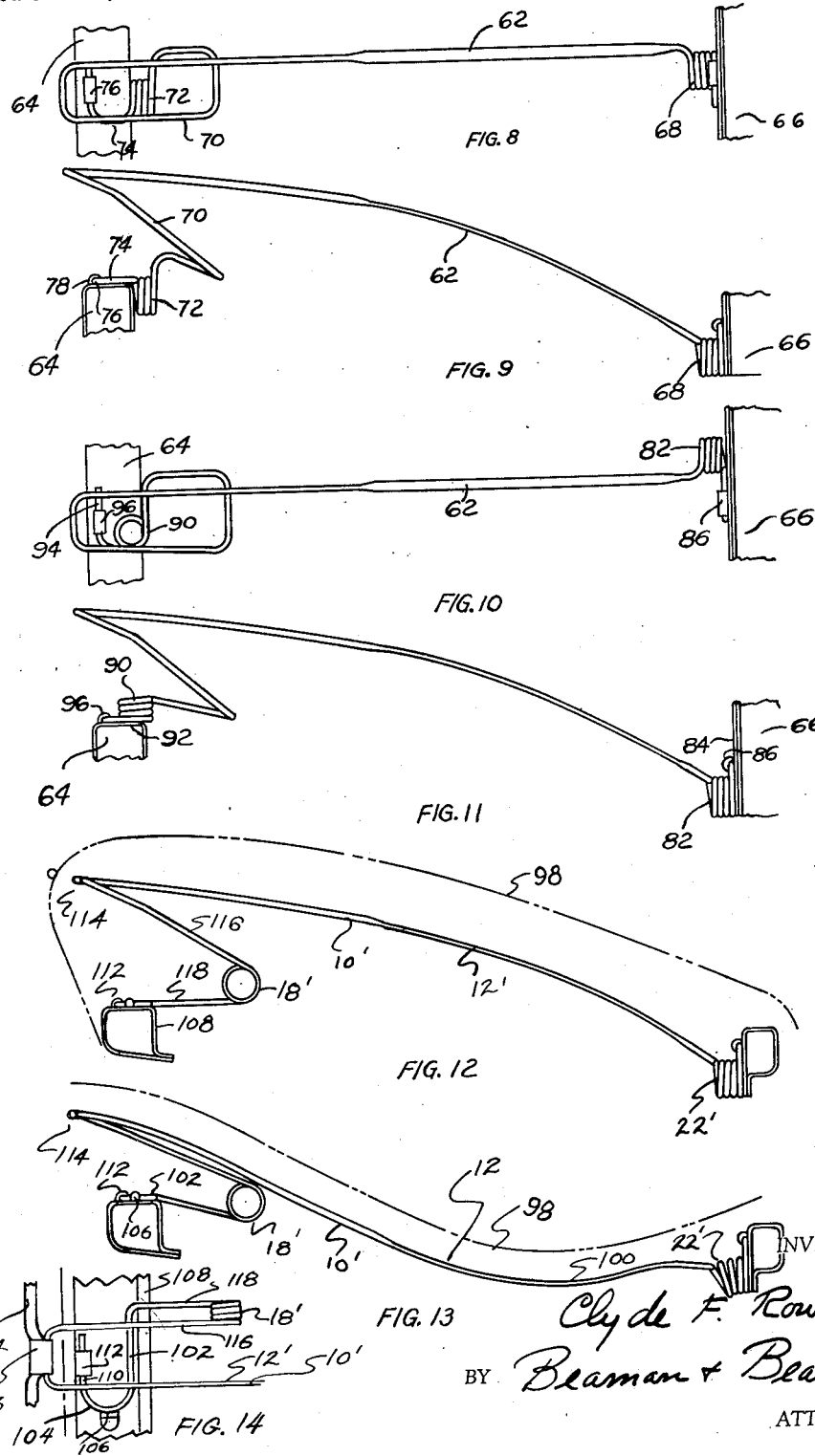

2,973,805

SPRING STRUCTURE FOR VEHICLES

Clyde F. Rowan, Jackson, Mich., assignor to Stubnitz Greene Corporation, Adrian, Mich., a corporation of Michigan Filed Nov. 4, 1957, Ser. No. 694,317

15 Claims. (Cl. 155—179)

The present invention relates to improvements in spring elements of the stringer type as disclosed in co-pending applications, Serial Nos. 561,470 and 633,883, filed January 26, 1956, and January 14, 1957, now Patent No. 2,871,922 and Patent No. 2,871,923, respectively.

In a stringer type spring element, as used in spring cushion structure for vehicles and the like, the main bridging portion of the element comprises a linear spring portion in the form of a section of relatively straight spring wire in contrast with sinuous and zig-zag spring wire elements. On opposite ends of the section of straight wire provisions are made for the attachment of the spring element to the marginal frames of the cushion spring structure in bridging relation with the spaced parts thereof.

It is the object of the present invention to modify the spring elements disclosed in said applications adjacent the points of attachment with the frame parts in order to improve the life of the spring element under repeated reflection and to also improve the riding qualities of the spring cushion structure when fabricated for use in vehicles and in which the stringer type of spring element is employed. This has been accomplished through the provision of one or more portions of coiled wire so disposed relative to the loading of the spring element in use as to increase the effective length of the spring element under deflection by "fanning" the convolutions of the coiled wire portions, the fanning of the wire coil being a departure from the usual practice of placing a spring coil under torsion by changing the overall length of the coil along its longitudinal axis.

In the drawings,

Fig. 1 is a perspective view of a spring element embodying at one end the invention, the element being shown removed from the frame of the spring cushion structure, Fig. 1a shows in side elevation a portion of the element of Fig. 1 attached to one end to a frame part, Fig. 1b is similar to Fig. 1a and illustrates the fanning of the coiled wire portion which takes place upon loading, Fig. 2 is a plan view of the end portion shown in Figs. 1a and 1b taken on the line IV—IV of Fig. 1a, Fig. 3 is a view similar to Fig. 1a of a modified end portion, Fig. 4 is a view similar to Fig. 2 taken on line IV—IV of Fig. 3, Figs. 5 and 6 corresponding to Figs. 3 and 4, respectively, and illustrate a further modification, Fig. 7 is similar to Fig. 6 and illustrates a slight modification in wire formation, Fig. 8 is a plan view of a spring element showing in bridging position between the spaced frame parts of a spring cushion structure, the invention being employed at both ends of the element, Fig. 9 is a side elevational view of Fig. 8, Figs. 10 and 11 correspond, respectively, to Figs. 8 and 9 and illustrate another modification, Fig. 12 is a side elevational view of a spring element similar to that shown in Fig. 1 located in the frame with the outline of the cushion illustrated, Fig. 13 illustrates the action of the spring element 12 under a deflecting load applied to the cushion, and Fig. 14 is a fragmentary top view of the torsion support of the spring element of Fig. 12 on the seat frame.

Referring to the drawings, the stringer type spring element 10, shown in Fig. 1, has a main linear portion 12 and end portions 14 and 16. As illustrated, the end portion 14 is in the form of a jack spring having a coiled portion 18 and a torsion bar foot portion 20 attached to the spring cushion frame, the longitudinal axis of the convolutions of the coiled portion 18 being at right angles to the longitudinal axis of the element 10. The opposite end portion 16 has a coiled portion 22 imposed between the linear portion 12 and the suspension bar portion 24.

In practice, the frame part 26 has a supporting ledge 28 upon which the bar 24 is supported with the end convolutions of the coil portion 22 abutting the face 30 of the frame part 26. Upon loading the linear portion 12 the convolutions of the coiled portions 22 will fan out as shown in Fig. 1b with the face 30 acting as a fulcrum for the outermost convolution and the remaining convolutions fulcruming upon each other in the general location indicated by reference character 32. The fanning of the convolutions of the coiled portion 22 provides additional effective wire length at a point of high stress in the element 10 when installed in a spring cushion structure. In practice, the presence of the coiled portion 22 has been found to materially increase the fatigue life of the element 10 and its component parts and the torsional action of the convolutions of the coiled portion 22 upon fanning, as shown in Fig. 1b, has materially contributed to the resilient supporting function of the linear portion 12. It will be noted that the longitudinal axis of the coiled portion 22 extends along the longitudinal axis of the element 10 rather than at right angles thereto as in the case of the coiled portion 18.

In the modifications of Figs. 3 and 4, in lieu of the suspension bar 24 of Fig. 2, the linear portion 12 terminates in an end portion having a torsion bar portion 34 supported in the ledge 36 of the frame part 38 with a reaction arm portion 40 which abuts the face 41 of the frame part 38. The coiled portion 42, corresponding to the portion 22, upon loading of the portion 12 will fan out in the manner of the portion 22 as indicated in Fig. 1b.

The modification of Figs. 5 and 6 disclose the end portion of the linear portion 12 as having a coiled portion 44, the abutment portion 46 and a transverse bar portion 48. The bar portion 48 is supported in a ledge 50 of the frame part 52 with the abutment portion 46 resting, or adapted to rest, upon the shelf 54 of the part 52. With the bar portion 48 held in fixed relation to the frame part 52 and the portion 46 abutting the shelf 54 loading of the linear portion 12 will cause the coiled portion 44 to fan out in the manner of the portion 22 as shown in Fig. 1b.

In Fig. 7 is shown a slight modification of the end structure of Fig. 6 wherein a more pronounced curved portion 56 is provided in order to place the linear portion 12 substantially upon the center line of the coiled portion 58 as well as that of the support structure defined by the abutment portion 60 and the transverse bar portion 61.

Referring to Figs. 8 to 13, inclusive, several forms of spring elements 62 are shown in which both ends of the element are provided with coiled wire portions having the longitudinal axis thereof disposed in the manner of the coiled portion 22 of Fig. 1, namely, in the general plane of deflection of the main bridging portion of the spring element. As shown, the spring element 62 is of spring wire stock and has certain portions thereof flattened as indicated. In each form of Figs. 8 to 13, inclusive, the element 62 is shown in bridging relation relative to spaced frame portions 64 and 66.

In Figs. 8 and 9, the coiled portion 68 is attached to the frame portion 66 in the manner of Fig. 1a. At the opposite end the fish mouth portion 70 terminates in a coiled portion 72 having an abutment portion 74 and a transverse bar portion 76, the bar 76 being held in a clip 78, in practice formed from the frame 64 with the abutment portion 74 resting on the top surface 80 of the frame 64. With this arrangement, the coils of portion 72 will "fan" upon loading of the spring element 62 in the manner shown in Fig. 1a.

The modification of Figs. 10 and 11 is similar to that shown in Figs. 8 and 9 as regard to the right hand end of the element 62, the coiled portion 82 abuts face 84 of the frame portion 66 and has a transverse bar portion 86 disposed in the clip 88 formed from the frame 66. At the other end of the element 62, the coiled portion 90 is shown seated upon the surface 92 of the frame portion 64 with the transverse bar 94 held in the clip 96.

In Fig. 12 the spring element 10' is shown supported in a seat frame with the outline of the cushion being indicated at 98. Fig. 13 shows the structure of Fig. 12 deflected by the weight of a seated person with the coil 22' being shown "fanned." It will be appreciated that the action of the coil 22' under the weight of a person sitting upon the cushion functions to assist in returning the portion 12' of the spring element 10' to its static position following deflection and after the load has been removed from the cushion. Also, the coil 22' functions to lower the deflected portion 100 below and directly ahead of the coil 22' to avoid a seated person experiencing chafing or burning at the back of the cushion which results when relative movement takes place between the cushion surface and the body of the person sitting upon the cushion and during a time of repeated deflection.

The coil 22' may conform in structure and function to the coil 22 of Fig. 1 with the nature of support from the seat frame and the action under a deflected load conforming to Figs. 1a and 1b.

In lieu of the form of the torsion bar foot 20 of Fig. 1 the spring element 10' is shown in Fig. 14 with a modified arrangement wherein the torsion bar portion 102 has a generally L-shaped extension of which the portion 104 thereof is backed up by an upright tab 106 pierced from and deflected out of the top surface of the frame 108 as well as a portion 110 which is held by a clip 112 likewise pierced from and formed out of the top surface of the frame 108. At the top of the jack spring portion is shown, clipped at 113, the usual upper border wire 114. The torsion bar 102 is supported upon the upper surface of the frame 108. The action of the upper and lower legs 116 and 118, respectively, of the jack spring portion about the axis of the portion 102 is illustrated in Fig. 13.

It will be noted that in the several illustrated forms of the invention, only in the form of Figs. 3 and 4 does the terminal transverse bar portion of the element 12 function as a torsional bar. In all the other forms the terminal torsion of the elements 12 and 62 at points directly adjacent the frame portions 64 and 66 is taken solely in the coiled portions 22, 44, 58, 68, 72, 82 and 90.

I claim:

1. An integral spring element for spring cushion structure disposed in use in bridging relation with spaced frame portions thereof comprising a main bridging spring portion having terminal support portions, at least one of said support portions being in the form of a coiled portion having its longitudinal axis generally disposed in the plane of deflection of the said bridging spring portion when in use, said coiled portion being disposed in relation to said bridging spring portion as to be deflected along its longitudinal axis to "fan" its convolutions to increase the effective length of the spring element under load deflection.

2. A spring element as defined in claim 1 wherein said main bridging spring portion is in the form of a linear spring portion of substantially straight spring wire.

3. A spring element as defined in claim 1 wherein said one terminal support portion takes the form of a transverse bar for connection to a frame part of the spring cushion structure and said coiled portion is directly adjacent said bar and has its immediately adjacent convolutions in position for abutting relation with the frame part.

4. In a spring cushion structure, the combination of spaced frame parts thereof, of an integral spring element in bridging relation to said parts, said element having a main bridge portion and terminal support portions, at least one of said support portions having a terminal end attached to one of said frame parts, a coiled portion disposed between said terminal end and said main bridging portion, the longitudinal axis of said coiled portion being generally disposed in the plane of deflection of said main bridging portion when in use, said coiled portion being directly adjacent said terminal end and supported relative to the immediately adjacent frame part to deflect the longitudinal axis of said coiled portion to "fan" the convolutions thereof upon the load deflection of said main bridging portion.

5. In a spring cushion structure as defined in claim 4 wherein said torsional end is a torsion bar.

6. In a spring cushion structure as defined in claim 4 wherein a convolution of said coiled portion abuts its associated frame part.

7. An integral spring element of the type described comprising a main bridge portion having terminal support portions at opposite ends, one of said support portions being in the form of a terminal attachment end and extending from a coiled portion immediately adjacent thereto, the longitudinal axis of said coiled portion being generally disposed in the plane of deflection of said main bridging portion when in use, the convolution of said coiled portion immediately adjacent said terminal end being disposed to abut a frame portion of said structure to effect deflection of the longitudinal axis of said coiled portion and "fanning" of its convolutions upon load deflection of said main bridging portion.

8. A spring element as defined in claim 7 wherein both of said terminal support portions comprise said coiled portion and said terminal attachment.

9. A spring element as defined in claim 8 wherein a fish mouth portion is provided between one of said coiled portions and said main bridging portion.

10. A spring element as defined in claim 8 wherein said main bridging portion is in the form of substantially straight wire portion.

11. A spring element as defined in claim 9 wherein said main bridging portion is in the form of a substantially straight wire portion.

12. In combination with a seat frame, a spring element supported in bridging relation to spaced opposed portions of said frame, said element having a jack spring portion at one end having upper and lower legs spaced by a coiled portion, said lower leg having a torsion bar portion at the end removed from said coiled portion and disposed at substantially right angles to said lower leg and being substantially parallel to the axis of said coil, said torsion bar portion resting upon a surface of said frame portion and having a generally L-shaped attachment extension likewise resting upon said frame portion, and means on said frame for attaching said extension to said last frame portion.

13. A single strand cushion spring comprising a front spring end portion made of wire bent in a substantially V-shape configuration and having at least one torsion bar disposed transversely of the spring, a substantially straight seating portion, a coil formed in the wire adjacent to the spring end portion, an additional coil formed in the wire rearwardly of the straight seating portion, said coils being arranged to be distended when the cushion spring is compressed.

14. A spring unit for a seat cushion having a rigid frame, comprising an integrally formed V-shaped front spring portion, a straight seating portion and a rear end portion, said front and rear spring portions being connected to said frame, said front spring portion having an integrally formed tension coil spring arranged to be operable in tension upon the application of weight to said seating portion.

15. A spring unit for a seat cushion having a frame, comprising a front spring portion, a straight seating portion and a rear end portion, said front and rear spring portions being connected to said frame, said front spring portion having a coil spring arranged to be operable in tension upon the application of weight to said seating portion.

References Cited in the file of this patent

UNITED STATES PATENTS 1,191,693     Hager  ---------------- July 18, 1916